United States Patent [19]

Kurata

[11] Patent Number: 4,506,302
[45] Date of Patent: Mar. 19, 1985

[54] CUT SHEET FACSIMILE
[75] Inventor: Masami Kurata, Kanagawa, Japan
[73] Assignee: Fuji Xerox Co., Ltd., Tokyo, Japan
[21] Appl. No.: 446,747
[22] Filed: Dec. 3, 1982
[30] Foreign Application Priority Data
Dec. 4, 1981 [JP] Japan .................. 56-194440
[51] Int. Cl.³ .................. H04N 1/04; H04N 1/10; H04N 1/02
[52] U.S. Cl. .................. 358/285; 358/287; 358/293; 358/294
[58] Field of Search .............. 358/257, 287, 285, 296, 358/293, 294, 304; 271/9
[56] References Cited
U.S. PATENT DOCUMENTS
4,342,052  7/1982  Rackley et al. .............. 358/287
4,417,282  11/1983  Yamamoto .............. 358/296
4,439,790  3/1984  Yoshida .............. 358/256

Primary Examiner—Howard W. Britton
Assistant Examiner—John K. Peng
Attorney, Agent, or Firm—Sughrue, Mion, Zinn, Macpeak, and Seas

[57] ABSTRACT

A facsimile apparatus is provided on its transmission side with sensors for determining the size of an original to be transmitted, and at its receiving side with a selector for providing sheets of the same size as the original for the reproduction thereof. In the case of smaller sized originals, if this size of sheet is not available at the receiving end, a size twice that of the original is selected. If originals are transmitted in succession, two such smaller originals may be recorded on the same recording sheet.

7 Claims, 2 Drawing Figures

CUT SHEET FACSIMILE

BACKGROUND OF THE INVENTION

This invention relates to a facsimile in which data are recording on cut or separate sheets.

Some present facsimiles use standardized sized sheets (hereinafter referred to as cut sheets) as signal receiving media, while the remaining devices use sheet rolls for this purpose. The facsimiles using the cut sheets are operated only according to a recording system in which, similarly as in a current application heat-sensitive recording system or a discharge destruction recording system, data are recorded by cylinder scanning, because of the following reason: The use of cut sheets for facsimile is disadvantageous in that, irrespective of the sizes of images to be recorded, the data are recorded on only one kind and size of sheet. On the other hand, in the case of facsimiles using the roll sheet, even when transmission originals are equal in size, the accuracy of a rotary cutter or the like of the system is limited, and accordingly the signal receiving sheets cut thereby are unavoidably somewhat different in size. Therefore, when these sheets should be filed neatly, it is necessary to cut them again so that they are equal in size.

SUMMARY OF THE INVENTION

In view of the foregoing, an object of this invention is to provide a facsimile which can use cut sheets even if not employing the cylinder scanning method for recording image data.

The foregoing object has been achieved by the provision of a cut sheet facsimile in which a plurality of cut sheet supplying units provided on the signal reception side are selectively operated according to the size of an image to be recorded.

DETAILED DESCRIPTION OF THE PREFERRED EMBODIMENTS

Figure 1:
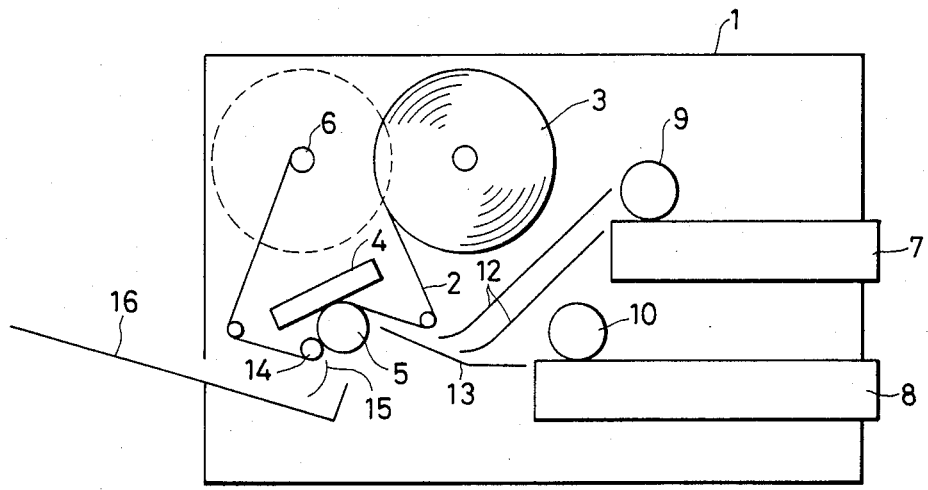
FIG. 1 is an explanatory diagram outlining the arrangement of a facsimile receiver according to the invention.

FIG. 1 shows a facsimile receiver according to one embodiment of the invention. The facsimile receiver 1 forms a received image according to a thermal transfer type recording system. For this purpose, an ink donor sheet 2 coated with ink which is thermally transferred (or fluidized or sublimated by heat) is employed as a recording medium in the device. The ink donor sheet 2 is supplied from a supply roll 3, and is wound on a winding roll 6 after passing through a recording section comprising a thermal head 4 and a back roll 5.

The device further comprises first and second cut sheet supplying units 7 and 8. The first cut sheet supplying unit 7 accommodates cut sheets of JIS size "A4," and the second cut sheet supplying unit 8 accommodates cut sheets of JIS size "B4." Feed rollers 9 and 10 are provided near the sheet discharging outlets of the cut sheet supplying units 7 and 8, respectively. The rollers 9 and 10 are selectively driven, so that a cut sheet guided by a guide 12 or 13 is delivered to the recording section, where data are recorded thereon. Thereafter, the cut sheet (signal receiving sheet) is separated from the ink donor sheet 2 while passing through the back roller 5 and a drive roller 14. The cut sheet is then delivered into a catch tray 6 while being guided by a guide 15. Thus, the recording operation is accomplished.

Figure 2:
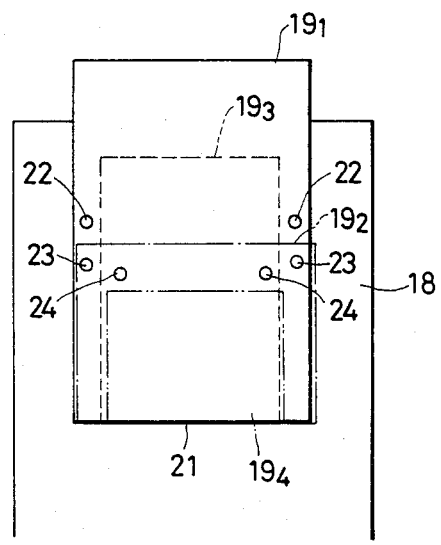
FIG. 2 is an explanatory diagram showing the positions of sensors arranged in an original size detecting mechanism employed in a facsimile transmitter.

A facsimile transmitter, which is adapted to transmit a video signal to the above-described facsimile receiver, is provided with an original size detecting mechanism for detecting the size of an original to be transmitted. One example of the original size detecting mechanism is as shown in FIG. 2. Four kinds of originals can be set in a tray 18. More specifically, an original $19_1$ of "B4" size indicated by the solid line, an original $19_2$ of "B5" size indicated by the one-dot chain line, an original $19_3$ of "A4" size indicated by the broken line and an original $19_4$ of "A5" size indicated by the two-dot chain line can be set in the original tray 18. In other words, the originals $19_1$ through $19_3$ are set along the central axis of the original tray 18 with one edge of each original aligned with a reference line 21. First sensors 22 and 22 are disposed at right and left positions located in a region of the tray 18 where an original $19_1$ of "B4" size is placed, and which are near a region of the original tray 18 where the original $19_2$ of "B5" size is placed. Second sensors 23 and 23 are disposed at right and left positions which are located in a region of the tray where only the transmission original $19_1$ and $19_2$ are set and which are close to the first sensors 22 and 22. Third sensors 24 and 24 are located at right and left positions in a region of the original tray where the originals $19_1$, $19_2$ and $19_3$ are placed (i.e., all except for the original $19_4$ of "A5" size) and which are adjacent to the second sensors 23 and 23.

The original size detecting mechanism includes a logic circuit (not shown) which discriminates the sizes of transmission originals according to the following logic table: In the table, the word "OFF" means that the sensor detects no original, while the word "ON" indicates that the sensor detects an original.

TABLE

| Sensor | | | |
| --- | --- | --- | --- |
| 22 | 23 | 24 | Size of Original |
| OFF | OFF | OFF | A5 |
| OFF | OFF | ON | A4 |
| OFF | ON | OFF | — |
| OFF | ON | ON | B5 |
| ON | OFF | OFF | — |
| ON | OFF | ON | — |
| ON | ON | OFF | — |
| ON | ON | ON | B4 |

The size data thus detected is transmitted to the facsimile receiver at the time of protocol. When the size of an original to be transmitted is detected as "A4" or "A5," by the facsimile receiver, the feed roller 9 is driven so as to feed a recording sheet of size "A4" from the first cut sheet supplying unit 7. When the size of an original to be transmitted is detected as "B4" or "B5," the feed roller 10 is driven so as to feed a recording sheet of "B4" size from the second cut sheet supplying unit.

When the recording sheet from the first and second cut sheet supplying unit 7 or 8 approaches the back roller 5, the drive roller 14 is driven to convey the ink donor sheet 2. As a result, the recording sheet is caused to run along the heat generating unit of the thermal head 4 while being held between the ink supplying surface (the lower surface, in FIG. 1) of the ink donor sheet and the back roller 5. Thus, data are thermally recorded on the recording sheet.

In the case where the size of an original to be transmitted is either "A4" or "B4" and the recording magnification is equal to one, the size of the recorded image is "A4" or "B4," and according the image data of one original are recorded over the entire area of the recording sheet. Therefore, whenever one recording sheet is recorded with image data, it is delivered into the catch tray 16, being guided by the guide 15.

On the other hand, in the case where the original was of the "A5" or "B5" size and the recording magnification was equal to one, the image data of one original is recorded on only the first half of the recording sheet. In this case, the facsimile receiver discriminates according to a control signal whether or not signal reception is to be carried out in succession. In the case of successive signal reception in this size, the drive roller 14 is temporarily stopped, so that the facsimile receiver is placed on standby for reception of the next video signal. After this signal has been recorded on the second half of the recording sheet, the latter is delivered. In the case where facsimile transmission is ended after the image data of one original are transmitted, the recording sheet is discharged with the second half area thereof left blank. In the case where the image data of at least three originals are received, whenever the image data of two originals are received, the video signal receiving operation is temporarily suspended, and a recording sheet is fed to the recording section. In the case where units for supplying cut sheets of "A5" and "B5" sizes are provided individually, it goes without saying that cut sheets may be supplied from these units. In this case, the image data of one original are recorded on one receiving sheet.

As is apparent from the above description, according to the invention, video data are recorded on cut sheets, and therefore various cut sheets of equal size can be selectively used. For instance, signal receiving sheets which are different in color according to the content of the transmission sheets or signal reception dates can be obtained. In the case where, for example, an image of "B5" size is recorded on a cut sheet of "B4" size as described above, two images can be recorded on one cut sheet, which facilitates the arrangement and storage of documents.

While the above embodiment of the invention has been described with respect to the case where the image data of an original are received with a recording magnification of one, it goes without saying that the technical concept of the invention can be applied to the case where the image data are received with an enlarging or contracting magnification. In the above embodiment, the size of a transmission original is detected by sensors on the side of the facsimile transmitter; however, the operator at the side of the facsimile transmitter may operates switches or the like to relay the size of the original and the size of the image to be recorded to the facsimile receiver.

What is claimed is:

1. A facsimile apparatus, comprising: a receiving side, a plurality of sheet supplying units at said receiving side for supplying recording sheets comprising at least two kinds of cut sheets of different sizes, respectively, a transmitting side, discriminating means at said transmitting side for sensing and logically discriminating the size of an image to be transmitted; and cut sheet supplying unit selecting means for selecting one of said cut sheet supplying units according to a discrimination result of said discriminating means, so that image data are recorded on a selected one of said recording sheets.

2. A facsimile as claimed in claim 1, said cut sheet supplying unit selecting means selecting that one of said cut sheet supplying units which accommodates recording sheets, the size of which are either equal to or twice as large as that of an image to be recorded, as discriminated by said discriminating means, whereby two successive images to be recorded may be recorded on one recording sheet.

3. A facsimile as claimed in claim 1, said discriminating means comprising a plurality of sensors for detecting the size of an original to be transmitted.

4. A facsimile as claimed in claim 1, said discriminating means comprising a plurality of sensor pairs arranged so as to detect sheets of different sizes.

5. A facsimile as claimed in claim 3, said selecting means selecting a sheet of the same size as the detected size of said original to be transmitted.

6. A facsimile as claimed in claim 3, said selecting means selecting a sheet of twice the detected size of said original to be transmitted.

7. A facsimile as claimed in claim 6, including means for determining if originals are transmitted in succession from said transmission side, to permit reproduction of two originals on one said sheet.

* * * * *